(12) United States Patent
Hedderly

(10) Patent No.: US 6,371,551 B1
(45) Date of Patent: Apr. 16, 2002

(54) INTEGRATED STEERING COLUMN, INSTRUMENT PANEL, AND COWL BODY STRUCTURE

(75) Inventor: Gregory Thomas Hedderly, White Lake, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/695,340

(22) Filed: Oct. 24, 2000

(51) Int. Cl.$^7$ .............................................. B62D 25/14
(52) U.S. Cl. ........................ 296/192; 296/70; 296/194; 180/90
(58) Field of Search ........................... 296/192, 70, 72, 296/194, 203; 180/90; 280/732, 728.2, 752, 779

(56) References Cited

U.S. PATENT DOCUMENTS

| | | | | |
|---|---|---|---|---|
| 5,005,898 A | * | 4/1991 | Benedetto et al. | 296/194 |
| 5,273,310 A | * | 12/1993 | Terai | 280/732 |
| 5,311,960 A | * | 5/1994 | Kukainis et al. | 180/90 |
| 5,312,133 A | * | 5/1994 | Pietila et al. | 280/752 |
| 5,324,203 A | * | 6/1994 | Sano et al. | 296/70 |
| 5,364,159 A | * | 11/1994 | Kelman et al. | 296/70 |
| 5,387,023 A | * | 2/1995 | Deneau | 296/70 |
| 5,556,153 A | * | 9/1996 | Kelman et al. | 296/70 |
| 5,564,515 A | * | 10/1996 | Schambre | 296/70 |
| 5,564,769 A | * | 10/1996 | Deneau et al. | 296/72 |
| 5,580,122 A | | 12/1996 | Muehlhausen | |
| 5,676,216 A | * | 10/1997 | Palma et al. | 296/70 |
| 5,685,598 A | * | 11/1997 | Inoue et al. | 296/70 |
| 5,707,100 A | * | 1/1998 | Suyama et al. | 296/70 |
| 5,762,395 A | * | 6/1998 | Merrifield et al. | 296/203 |
| 5,823,602 A | * | 10/1998 | Kelman et al. | 296/70 |
| 5,857,726 A | * | 1/1999 | Yokoyama et al. | 296/70 |
| 5,931,520 A | | 8/1999 | Seksaria et al. | |
| 5,934,744 A | * | 8/1999 | Jergans et al. | 296/70 |
| 5,957,498 A | | 9/1999 | Holland et al. | |
| 5,992,925 A | * | 11/1999 | Alberici | 296/72 |
| 6,073,987 A | * | 6/2000 | Lindberg et al. | 296/70 |
| 6,231,116 B1 | * | 5/2001 | Naert et al. | 296/70 |
| 6,237,956 B1 | * | 5/2001 | Haba et al. | 296/192 |
| 6,276,739 B1 | * | 8/2001 | Wich | 296/72 |
| 2001/0024035 A1 | * | 9/2001 | Scheib et al. | 280/779 |

FOREIGN PATENT DOCUMENTS

EP          0374975         6/1990

* cited by examiner

*Primary Examiner*—Ken Patel
(74) *Attorney, Agent, or Firm*—Gregory P. Brown

(57) ABSTRACT

An integrated front body clip including an instrument panel support structure, steering column support structure, and cowl structure forming a shared, dependent, and complementary support structure between the A-Pillars of a vehicle. Front and rear magnesium casting, each having a plurality of cast in features, are clamshelled into a single integrated clip. The resultant integrated front body clip offers substantial weight and improves the torsional and bending strength characteristics as compared with traditional steel structures. By maximizing cast in features, redundancy between competing parts is eliminated with an increase in dimensional control. Further, by creating a hollow region within the resultant clip structure, heated or cooled air may be moved without complex ductwork. In an alternative preferred embodiment, the front casting is provided in three modular parts that may be arranged for use in left-side or right-side driving vehicles.

5 Claims, 3 Drawing Sheets

INTEGRATED STEERING COLUMN, INSTRUMENT PANEL, AND COWL BODY STRUCTURE

TECHNICAL FIELD

The present invention relates generally to support structures and more particularly to integrated steering column, instrument panel, and cowl body structure for use in vehicles.

BACKGROUND

It is known in the prior art to provide cross car support structure for an instrument panel assembly in a vehicle. The typical cross car support structure must support many instrument panel components, such as steering wheels, air bag modules, HVAC modules, and glove boxes. Traditionally, most instrument panel support structures include a metal beam made of stamped steel or magnesium.

It has also been suggested to provide cross car beam structures having composite compositions reinforced with metal. When mainly plastic or composite-type cross car beams have been used, they are typically composed of several pieces which have relatively complex shapes and which are stacked together and attached in a complicated manner to provide sufficient strength or require additional metal cross beams or mounting brackets.

In addition to instrument panel support structures, vehicles typically have a separate cowl support structure located between the instrument panel and the engine. This cowl support structure is typically a complex stamped steel weldment fabrication and is made to support structures such as wiper motor mounts, wiper pivot journals and fulcrums, hood hinge mounts, AC/heater mounts, or brake boosters. Similar to the instrument panel support structure, strategies have been incorporated to ensure that the cowl structure itself can support the various components and attempts have been made to utilize alternative materials such as plastics for weight savings.

However, the instrument panel support structure and the cowl support structure exist as separate, and at times, antagonistic components. These components create unnecessary redundant support structure, weight, and packaging space. Further, as two separate structures, body stiffness is less than desirable.

It is thus highly desirable to combine the instrument panel support structure and cowl support structure into one integrated support structure that eliminates these problems, and to do so in a manner which provides modular components for ease of assembly and versatility.

SUMMARY OF THE INVENTION

It is an object of the present invention to bring together the instrument panel support structure, steering column support structure and cowl structure into a shared, dependent, and highly complementary support structure between the A-Pillars. The above object is accomplished by clamshelling the proposed cowl and instrument panel casting together to create an integrated, rigid, chamber-like structure.

The integrated casting provides many benefits over previous designs. First, the new casting provides substantial weight savings both through the use of magnesium to replace steel in the prior art and because the new design eliminates redundant support and component structure. The elimination of redundancy also creates extra packaging space within the vehicle. Also, the decreased weight in the upper portion improves rollover stability by lowering the center of gravity within the vehicle.

By maximizing cast-in features, the present invention also eliminates parts and secondary operations, resulting in potentially substantial cost savings and further decreasing the weight within the vehicle. Dimensional control and repeatability within the casting allows for increased margin control, which results in a casting with component boundaries with less squeak and rattle potential.

In addition, the magnesium clamshell structure is designed having similar or superior bending and torsional strength as compared to traditional steel structures. The clamshell shape is structural in that it uses a matched "I" value for the mechanical properties of magnesium.

Also, the hollow resultant clamshell structure offers advantages for packaging and air movement. First, wires or other secondary components may be placed within the hollow section in an area that is not easily accessible. Further, this hollow area within the clam shell castings is ideal for moving air for heating and cooling throughout the passenger compartment. It is contemplated that by integrating additional features within the castings, this air movement can be moved from the hollow structure, through the A pillars, into the doors, and into the B pillars of the vehicle. This airflow can move through the hollow structure itself, or through a sleeve placed within the hollow structure.

In addition, it is contemplated the front section of the casting may be cast into a three-piece modular unit, wherein the resultant castings may be assembled for use on vehicles for use on right-side or left-side drive vehicles.

Other objects and advantages of the present invention will become apparent upon considering the following detailed description and appended claims, and upon reference to the accompanying drawings.

DESCRIPTION OF THE PREFERRED EMBODIMENT(S)

Figure 1:
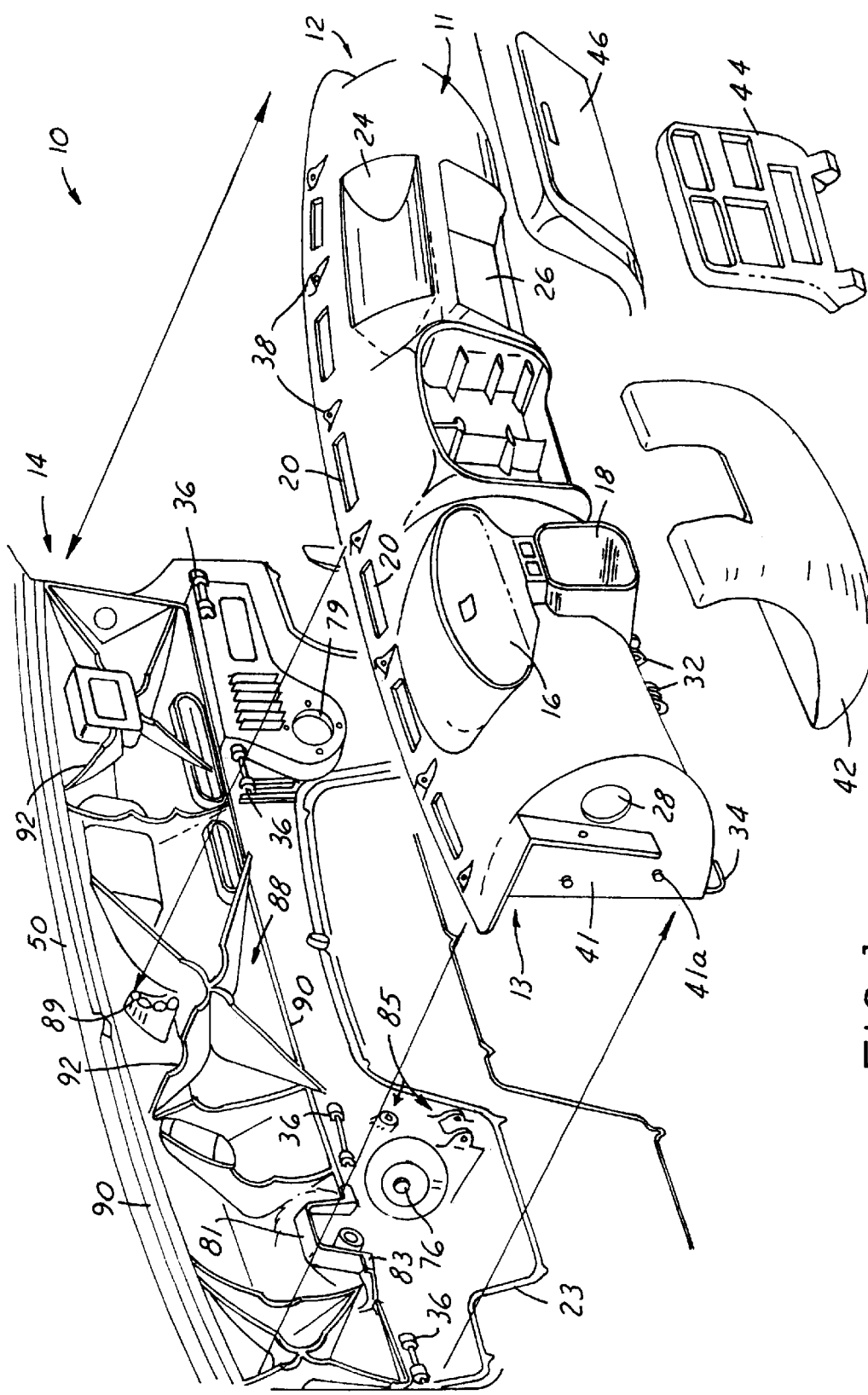
FIG. 1 is an exploded view of a front casting, a rear casting, and an A-Pillar according to a preferred embodiment of the present invention.
Figures 2, 3:
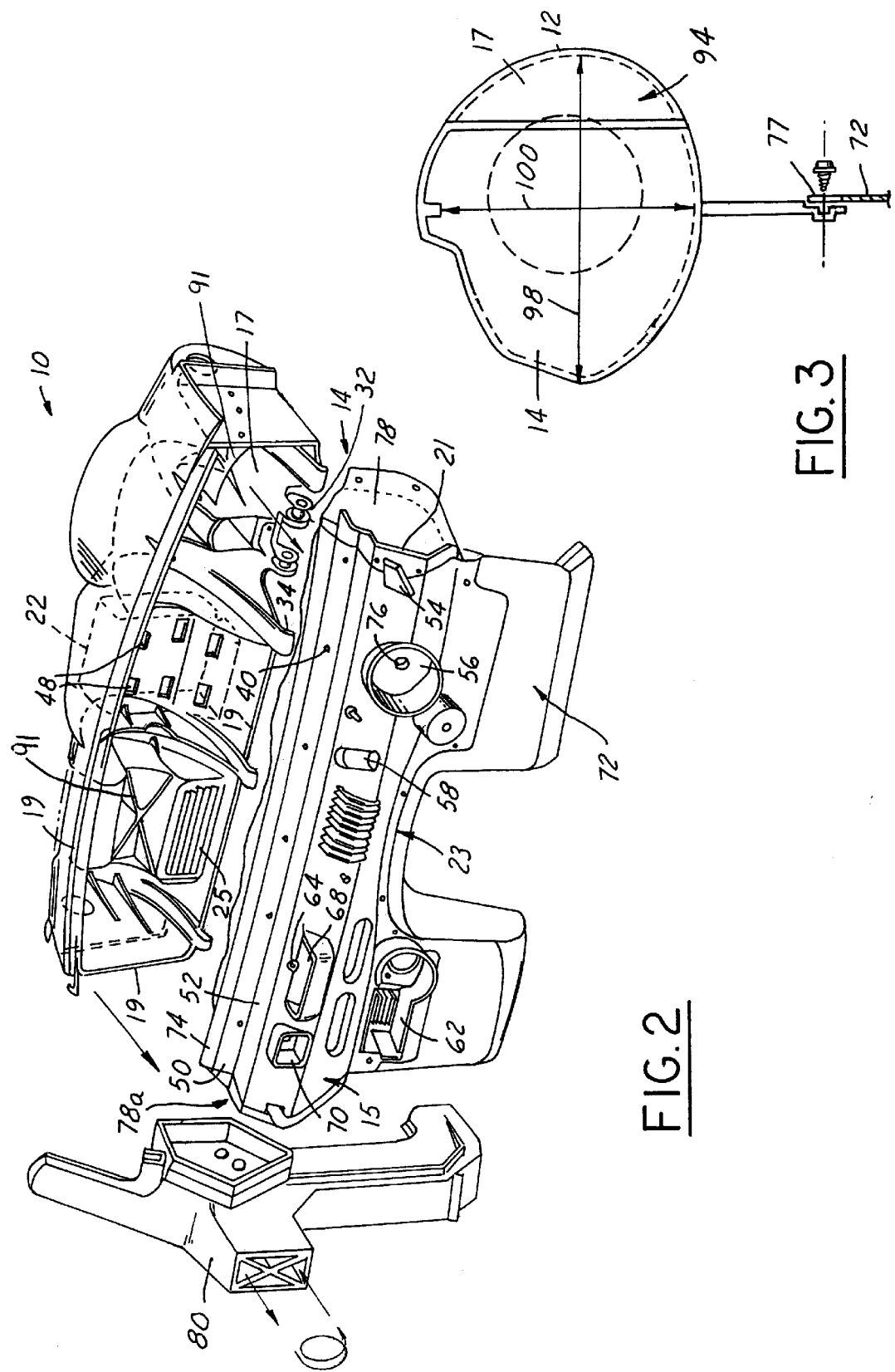
FIG. 2 is rear view of FIG. 1.
FIG. 3 is a side view of the assembled front and rear casting of FIG. 1.

Referring now to FIGS. 1 and 2, an integrated front body clip 10 according to a preferred embodiment is depicted. The clip 10 has a front casting 12 and a rear casting 14 that are preferably comprised of ductile AM-50 magnesium. The front casting 12 and rear casting 14 are pressure die cast by known techniques.

With the present invention, numerous components are integrated into each of the castings. As such, the passenger side 11 of the front casting 12 includes a cluster pocket 16, a steering column receiver 18, a plurality of register holders 20, a center accessory stack area 22, an air bag channel 24, and glove box 26. An air to door opening 28, a pair of pedal journals 32, a pair of front A pillar overlaps 78, 78a located on each side of the front casting 12, and a plurality of hooked flanges 34 are also integrated into the front casting 12. A parking brake (not shown) may be secured within the side shelf region 41 of the front casting 12 through a series of screw holes 41a. The integrally cast heater/AV 79 is designed to secure the blower assembly (not shown) of the heater/air-conditioning unit (not shown).

A plurality of foam covers 42, 44, 46 are typically placed over portions of the front casting 12. These covers 42, 44, 46 provide an aesthetically pleasing surface within the passenger compartment and can provide some padding to a passenger in the case of an accident. These covers 42, 44, 46 are easily replaceable if damaged. Further, these covers may be integrated into a one-piece cover (not shown) two-piece cover, or multi-piece cover as is well known in the art.

The cowl side 13, or inner side 13 of the front casting 12, as depicted in FIG. 2, contains a middle portion 17 and an outer sealing 19. The middle portion 17 is hollowed in a substantially half elliptical shape that is similar to the shape of the outer passenger side 11 of the front casting 12. The middle portion 17 contains a series of web stiffening ribs 91 that add structural support to the front casting 12. Further, a series of wire loom pass-through holes 48 are shown within the middle portion 17 that are coupled to the integrally cast cluster pocket 16. These wire loom pass-through holes 48 provide access for any wiring that is coupled to a media system (not shown) that is typically contained within the center accessory stack area 22. In addition, these wire loom pass-through holes 48 provide wire retention for the loom branches for the media system. A plurality of heat exchanger fins 25 are also integrated within the middle portion 17 and provide heat transfer surfaces in non-visible areas to aid in electric heat dissipation.

Similar to the front casting 12, the present invention integrates numerous components into the rear casting 14. The rear casting 14 includes a clamshell region 21 a lower region 23 and a fence line 50.

As best seen on the engine side 15 of the rear casting 14, the clamshell region 21 has a water run off 52 along its top edge, a pair of hood hinge pockets 54, an brake booster compartment 56, a wiper motor mount 58, a wiper arm pivot journal 64, a cruise control mount 66, a fluid reservoir 68, a rear A pillar overlap 78, 78a on each side of the clamshell region 21, and an electrical block mount 70. The brake booster compartment 56 is cast to contain approximately one-half of the brake booster chamber (not shown) when fully assembled.

The lower region 23 contains a climate control compartment 62, an I shaft pass-through (shown as 76 on FIG. 1), a blower mount and an accelerator pedal pivot (shown as 79 and 85, respectively, on FIG. 1) having a pass-through grommet hole. In addition, the climate control compartment 62 is designed to contain approximately one-third of a climate control unit (not shown).

As best seen in FIG. 1, the rear casting 14 also contains a cowl top casting ledge 81 having a pair of hook lips 83.

Secured to the bottom of the lower region 23 is a pull out dash connection 72. The dash connection 72 has as a water shingle overlap (shown as 77 on FIG. 4) to the lower region 23. The dash connection 72 is designed to separate during crash dynamics to minimize crush intrusion, especially rearward of the engine.

The fence line 50 contains a windshield lip 74. The windshield lip 74 is shaped to complement the lower portion of an attached windshield (not shown) to ensure a tight fit.

The clamshell region 21 of the rear casting 14, as depicted in FIG. 1, contains a middle region 88 and an outer sealing 90. The middle region 88 is hollowed in a substantially half elliptical shape that is similar to the shape of the engine side 15 of the rear casting 14. The middle region 88 contains a series of web stiffening ribs 92 that add structural support to the rear casting 14 and can be cast with cradling relief for air duct work (not shown). The middle region also has a wiper fulcrum 89.

The front casting 12 and rear casting 14 are "clamshelled", or coupled, by first securing each of the plurality hooked flanges 34 within the corresponding post 36 contained on the rear casting 14 and by securing the pedal journals 32 within each hook lip 83 on the cowl top casting ledge 81 contained on the rear casting 14 and then fastening the top of the front casting 12 to the rear casting 14 by lining up and bolting screws within screw holes 38 and 40 to form the integrated front body clip 10. Note that screw holes 40 are not through holes, but receptacles for receiving screws that is known in the art. Thereafter, the front and rear A-Pillar overlaps 78, 78a may be coupled to each of the A-Pillars 80 to secure the clip 10 laterally.

As shown in FIG. 3, when the front casting 12 is fully coupled to the rear casting 14 to form the integrated front body clip 10, the outer sealing 19 of the front casting 12 is substantially sealed to the outer sealing 90 of the clamshell region 21 of the rear casting 14 to form an elliptically shaped region 94. Preferably, the outer sealing 19 has a tongue like protrusion that is accepted within a coupling receptacle on the outer sealing 90. However, the shapes of the outer sealings 19, 30 may be modified as is known in the art to substantially seal the front casting 12 to the rear casting 14.

A hollow region 96 is formed within the elliptically shaped region 94 that is defined by the middle region 17 and the middle region 88. This hollow region 96 has two important functions. First, it provides a protective storage area for many packaging items. For example, this hollow region 96 could contain wiring, alarms, computer navigation systems, or any other circuitry that needs protection from engine components or weather. Second, the hollow region 96 provides an open area for transporting hot or cool air to the passenger compartment. For example, cool air produced by evaporative cores contained within the integrally cast climate control compartment 62 of the rear casting 14 can be transported within the hollow region 96 to the air to door opening 28 and into a door (not shown). This air could then enter the passenger compartment through a side vent (not shown). In another preferred embodiment of the present invention, a thermal sleeve (not shown) could be cradled within the web stiffening ribs 19, 92 contained within the hollow region 96 and be coupled to the climate control unit and to the passenger compartment. This thermal sleeve provides for a more efficient temperature transfer of air within the hollow region 96 to the passenger compartment than the hollow region 96 alone. The sleeve, preferably, would be composed of ABS (acrylonitrile butadiene styrene) or some other thermosetting polymer with a thickness of approximately between 1 and 3 millimeters.

The size and shape of the elliptically shaped region 94 are a function of the desired bending and torsional strength, or "I value", for the clip 10, the NVH (noise, vibration, harshness) requirements of the resultant structure, and the size of the hollow region 94 necessary to hold wires and move a desired amount of air. In a preferred embodiment of the present invention, the elliptically shaped region 94 is approximately 20 inches across its major horizontal axis 98, and approximately 8–12 inches, with approximately 12 inches preferable, across it minor vertical axis 100, thereby generating an "I value" sufficient to support a steering column (not shown) and steering column air bag unit (not shown) at approximately 45 Hertz vertical frequency, with a preferred range of 45–55 Hertz. Of course, the dimensions of the elliptically shaped region 94 may vary along the major horizontal axis 98 or minor vertical axis 100 and still be within the spirit of the present invention.

Figure 4:
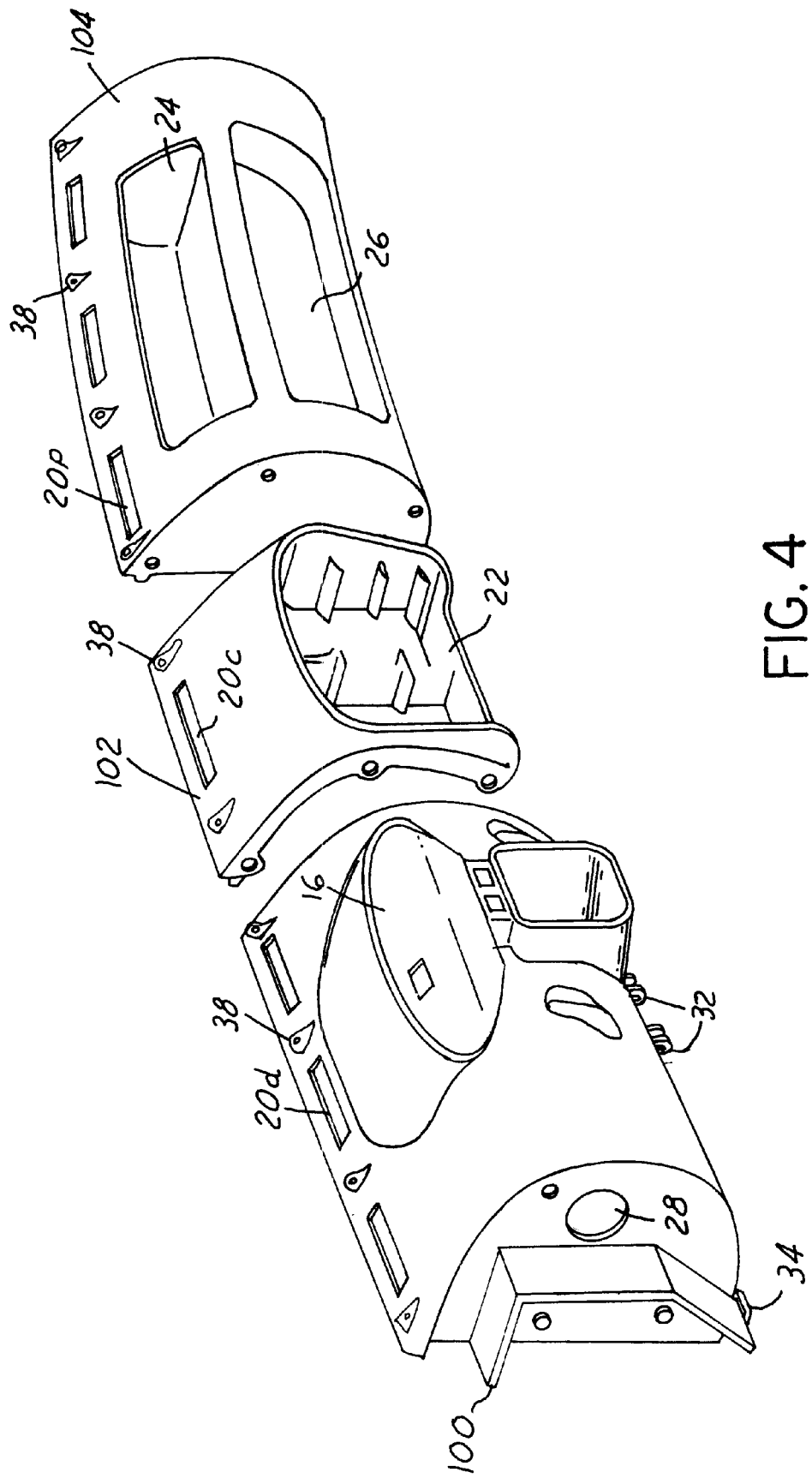
FIG. 4 is an exploded view of a three-piece modular front casting according to another preferred embodiment of the present invention.

FIG. 4 depicts another preferred embodiment of the present invention, in which the front casting 12 is cast in three parts as a driver side casting 100, a center stack casting 102, and a passenger side casting 104. These castings 100, 102, 104 may then be arranged for use on right side drive or left side drive vehicles by simply interchanging the location of the driver side casting 100 relative to the passenger side casting 104, with the center stack casting 102 always being coupled between them.

The driver side casting 100 contains a steering column receiver 18, cluster pocket 16, a plurality of screw holes 38 and a plurality of register holders 20d. The steering column receiver 18 is centered relative to the length 1 of the casting 100 to ensure that it is centered relative to the driver seat (not shown) within the vehicle.

The center stack casting 102 contains the center stack 22, a plurality of screw holes 38, and some of the register holders 20c. The passenger side casting 104 has a similar length 1 as the driver side casting 100, and contains air bag channel 24, glove box 26, a plurality of screw holes 38 and the rest of the register holders 20p. The number and location of the register holders 20p and screw holes 38 on the passenger side casting 104 are located in a relative position similar to the number and location of the register holders 20d and screw holes 38 on the driver side casting 100 to ensure that the driver side casting 100 and passenger side casting 104 are interchangeable for a right-side drive or left-side drive vehicle.

Each of the castings 100, 102, 104 are smooth and flat along its outer edges to ensure a tight fit between the three parts of the front casting 12 regardless of the arrangement. However, alternatively, a side shelf region 41, air to door opening 28 and screw holes 41A may be cast in either the driver side casting 100 as is depicted in FIG. 4.

To arrange the front casting 12 for a left side drive vehicle, as viewed from the passenger compartment forward, the left side of the center stack casting 102 is coupled with the right side of the driver side casting 100, while the right side of the center stack casting 102 is coupled with the left side of the passenger side casting 104. In a right side drive vehicle, the opposite occurs, wherein the right side of the center stack casting 102 is coupled with the left side of the driver side casting 100, while the left side of the center stack casting 102 is coupled with the right side of the passenger side casting 104. The front casting 12 is then coupled to the rear casting 14 to form the integrated front body clip 10 as described above in FIGS. 2 and 3.

The integrated front body clip 10 provides many benefits over previous designs. First, the new integrated front body clip 10 provides substantial weight savings both through the use of magnesium to replace steel in the clip 10 and because the new design eliminates redundant support and component structure. With the clip 10 as illustrated in FIGS. 1 and 2, it is estimated that approximately 20 pounds of weight savings may be realized over traditional assemblies. This results in higher fuel economy. Further, the clip 10 lowers the center of gravity within the vehicle, which results in improved roll stability. The elimination of redundancy also creates extra packaging space within the vehicle.

By maximizing cast-in features, the present invention eliminates parts and secondary operations, resulting in potentially substantial cost savings. For example, the present invention is cast to carry both heater and air conditioning components, thereby dramatically simplifying the complex inner structure typical in typical instrument panels.

By simplifying the complexity, an additional benefit is realized for cooling component parts. As less structure, or ductwork, is needed to support the various components, more room is available to move air to cool the various components.

Also, the present invention offers a dramatic improvement in dimensional control of the casting of the front casting 12 and rear casting 14. For example, the dimensional control between the top portion of the front casting 12 and rear casting 14 will allow a tighter glass fit between them, resulting in less wind noise and possible leakage points. Dimensional control will also improve crash characteristics because of a tighter fit of the A-pillar overlap 76 to the A-pillar 80. In addition, because of the tight tolerances achievable in the magnesium casting, component parts that are related to, but not contained within, the clip 10 may be located closer to the clip 10, resulting in higher packaging efficiency within the vehicle. For example, a dash boot holder 108, which is typically located 3–4 inches from the brake booster, may be moved closer to the brake booster because the brake booster is partially contained within the brake booster compartment 58. This allows the brake booster and steering intermediate shaft (not shown) to operate in closer proximity to one another and simplifies the design of the steering intermediate shaft.

In addition, the "I" value of the resultant magnesium clamshell clip 10 can be modified by increasing or decreasing the length across its major or minor axis. This enables manufactures to provide clips 10 with superior bending and torsional strength characteristics as compared to traditional steel structures having a similar size and shape. This can also improve NVH and crash dynamics.

Also, when components within the clip 10 are fused together and not permitted to drift with tolerance variation, the need for ultra-large clearance zones is reduced. In the preferred embodiments as depicted in FIGS. 1–4, this provides approximately two inches of additional room. Depending upon the manufacturer's preference, this additional two inches can either provide additional room in the passenger compartment or be used to reduce the overall size of the vehicle.

Further, by dividing the front casting 12 into a three-piece modular unit, wherein the driver side casting and passenger side casting may be interchanged for use in a left side drive and right side drive vehicle, one full set of castings may be eliminated. This results in substantial cost savings associated with engineering the extra casting.

While the invention has been described in terms of preferred embodiments, it will be understood, of course, that the invention is not limited thereto since modifications may be made by those skilled in the art, particularly in light of the foregoing teachings.

What is claimed is:

1. An integrated magnesium clip for use in a vehicle, the integrated clip comprising:

a front magnesium casting having a passenger side and a cowl side, said passenger side having a plurality of integrally cast first features, said cowl side having a outer seal and a hollowed out middle portion, said hollow out middle portion having a plurality of integrally cast second features; and a rear magnesium casting having a clamshell region, a lower region and a fence line, said clamshell region having an engine side and a front side, said engine side having a plurality of integrally cast third features, said front side having a second outer seal and a second hollowed out middle region, said second hollowed out middle region having a plurality of integrally cast fourth features, said lower region having a plurality of integrally cast fifth features, wherein said front magnesium casting and said rear magnesium casting are coupled such that said outer seal and said second outer seal are substantially coupled to each other, thereby creating a hollow chamber within said front magnesium casting and rear magnesium casting defined by said hollowed out middle portion and said second hollowed out middle region, wherein said coupled front magnesium casting and said rear magnesium casting have a substantially elliptical shape along a coupled side region having a major axis having a first length and a minor axis having a first width.

2. The magnesium clip of claim 1, wherein said first length and said first width are a function of a desired "I" value and a desired air flow within said hollow region.

3. The magnesium clip of claim 1, wherein said plurality of integrally cast first features is selected from the group consisting of a cluster pocket, a steering column receiver, a plurality of register holders, a center accessory stack area, an air bag channel, a glove box, an air to door opening, a pair of pedal journals, and a plurality of hooked flanges.

4. The magnesium clip of claim 1, wherein said plurality of integrally cast second features is selected from a group consisting of a plurality of front casting web stiffening ribs, a plurality of heat exchanger fins, and a plurality of wire loom pass-through holes;

wherein said plurality of integrally cast third features is selected from a group consisting of a water run off region, a pair of hood hinge pockets, a brake booster compartment, a wiper motor mount, a wiper arm pivot journal, a cruise control mount, a fluid reservoir, a cowl casting ledge, a pair of hook lips, and an electrical block mount;

wherein said plurality of integrally cast fourth features is selected from a group consisting of a plurality of rear casting web stiffening ribs and a wiper fulcrum; and wherein said plurality of integrally cast fifth features is selected from a group consisting of a climate control compartment, an accelerator pivot point, an I shaft pass-through, a plurality of posts, and a blower mount.

5. The integrated clip of claim 1 further comprising a sleeve coupled to a climate control unit and said air to door opening within said hollow chamber for moving air from said climate control unit to a passenger compartment.

* * * * *